(12) United States Patent
Nam

(10) Patent No.: US 8,325,130 B2
(45) Date of Patent: Dec. 4, 2012

(54) TOUCH TYPE ELECTROPHORETIC DISPLAY DEVICE

(75) Inventor: Seung-Seok Nam, Seoul (KR)

(73) Assignee: LG Display Co., Ltd., Seoul (KR)

( * ) Notice: Subject to any disclaimer, the term of this patent is extended or adjusted under 35 U.S.C. 154(b) by 589 days.

(21) Appl. No.: 12/556,689

(22) Filed: Sep. 10, 2009

(65) Prior Publication Data

US 2010/0123673 A1 May 20, 2010

(30) Foreign Application Priority Data

Nov. 20, 2008 (KR) .................. 10-2008-0115918

(51) Int. Cl.
*G09G 3/34* (2006.01)
(52) U.S. Cl. ......... 345/107; 345/173; 345/174; 345/204
(58) Field of Classification Search ................ None
See application file for complete search history.

(56) References Cited

U.S. PATENT DOCUMENTS

| 2007/0146354 A1* | 6/2007 | Kubota et al. | 345/204 |
| 2009/0102823 A1* | 4/2009 | Tateuchi | 345/204 |
| 2010/0123673 A1* | 5/2010 | Nam | 345/173 |

* cited by examiner

*Primary Examiner* — Joseph Haley
*Assistant Examiner* — Ifedayo Iluyomade
(74) *Attorney, Agent, or Firm* — Morgan, Lewis & Bockius LLP

(57) ABSTRACT

A touch-type electrophoretic display device, including: a first substrate with crossing gate and data lines, defining pixels, sensing signal lines parallel to the data lines, first touch driving voltage lines parallel to the gate lines, at each pixel: a driving thin film transistor (TFT) connected to the gate and data lines, a pixel electrode connected to the driving TFT, a switching TFT connected to the sensing signal and gate lines, and a photo TFT connected to the first touch driving voltage lines and the switching TFT and recognizing an applied touch, a lead-out driver detecting a position of the photo TFT when a sensing signal is transferred and the sensing signal lines, and outputting touch data, a gate control signal (GCS) generating unit outputting: a touch mode gate control signal when touch data is not inputted, and a driving mode GCS for converting an image if a touch is applied.

7 Claims, 3 Drawing Sheets

TOUCH TYPE ELECTROPHORETIC DISPLAY DEVICE

BACKGROUND OF THE INVENTION

1. Field of the Invention

The present invention relates to a touch type electrophoretic display device and, more particularly, to a touch type electrophoretic display device capable of minimizing the number or size of gate drivers by minimizing the number of gate lines.

2. Description of the Related Art

In general, an electrophoretic display device is an image displayer using a phenomenon that when a pair of electrodes receiving voltage are put in a colloid solution, colloid particles are moved to one polarity.

The electrophoretic display device is a display device in which a transparent conductive film is coated on a base film which is thin and can be easily bent like paper or plastic to drive electrophoretic suspension and receives much attention as electric paper that may replace the conventional printing mediums such as books, newspapers, and the like.

The electrophoretic display device is advantageous in that it can be easily carried around because it does not need a backlight and has good flexibility. Recently, research for a model emphasizing portability by adding a touch function to the electrophoretic display device is actively ongoing.

The touch type electrophoretic display device will now be described with reference to the accompanying drawings.

An electrophoretic panel provided in a general touch type electrophoretic display device as shown in FIG. 1 includes a first substrate 1 on which first gate lines GL11~GL1m and data lines DL1~DLn cross to define a plurality of pixels, and a second substrate (not shown) disposed to face the first substrate 1.

With reference to FIG. 2, on the first substrate, a plurality of second gate lines GL21~GL2m are formed to be parallel to the first gate lines GL1~GL1m, a plurality of sensing signal lines SL1~SLn are formed to be parallel to the data lines DL1~DLn, and a plurality of first and second touch driving voltage lines 3 and 4 are formed to be parallel to the first and second gate lines GL11~GL1m and GL21~GL2m. A driving thin film transistor (TFT_D), a pixel electrode 5, a switching TFT (TFT_S), a photo TFT (TFT_P) are formed at each pixel.

The driving TFT (TFT_D) is formed to be connected to the first gate lines GL11~GL1m and the data lines DL1~DLn, the pixel electrode 5 is formed to be connected to the driving TFT (TFT_D) within a corresponding pixel, the switching TFT (TFT_S) is formed to be connected to the second gate lines GL21~GL2m and the sensing signal lines SL1~SLn, and the photo TFT (TFT_P) is formed to be connected to the first touch driving voltage line 3 and the switching TFT (TFT_S). Here, whether the photo TFT (TFT_P) is turned on or off or a flow amount of the photo TFT (TFT_P) are determined according to the amount of light.

Although not shown, a common electrode (not shown) is formed on the second substrate, and an electrophoretic film (not shown) is formed between the first substrate 101 and the second substrate.

With reference to FIG. 1, the general touch type electrophoretic display device includes a driving unit for driving the electrophoretic panel. The driving unit includes a timing controller 10, a first gate driver 12a, a second gate driver 12b, a data driver 13, and a lead-out driver 14.

The timing controller 10 generates a gate control signal by using a signal inputted from an external source (e.g., system) and outputs the gate control signal to the first and second gate drivers 12a and 12b, generates a data control signal and outputs it to the data driver 13, and outputs a pixel voltage which has realigned image data inputted from the external source (e.g., system) to the data driver 13.

The first gate driver 12a drives the first gate lines GL11~GL1m by using the gate control signal from the timing controller 10, the second gate driver 12b drives the second gate lines GL21~GL2m by using the gate control signal from the timing controller 10, and the data driver 13 receives a data control signal and a lo pixel voltage from the timing controller 10 and supplies the pixel voltage to the data lines DL1~DLn according to the data control signal.

When the photo TFT (TFT_P) is operated according to a user touch and a sensing signal is transferred via the switching TFT (TFT_S) and the sensing signal lines (SL1~SLn) within a corresponding pixel, the lead-out driver 14 outputs touch data obtained by detecting the position of the photo TFT (TFT_P), namely, coordinates of a touched portion, to the timing controller 10. Upon receiving the touch data, the timing controller 10 supplies a pixel voltage for converting an image in relation to the user touched portion to the data driver 13.

In the general touch type electrophoretic display device constructed as described above, the second gate lines GLS1~GL2m are additionally formed to drive the photo TFT (TFT_P) formed to provide the touch function. Thus, compared with an electrophoretic display device without a touch function, the touch type electrophoretic display device is disadvantageous in that it has a significantly larger number of gate lines and it needs the second gate driver 12b to drive the second gate lines GL21~GL2m.

SUMMARY OF THE INVENTION

Therefore, in order to address the above matters, the various features described herein have been conceived. One aspect of the exemplary embodiments is to provide a touch type electrophoretic display device capable of minimizing the number of gate lines and minimizing the number or size of gate drivers.

This specification provides a touch type electrophoretic display device including: a first substrate on which a plurality of gate lines and a plurality of data lines cross to define a plurality of pixels; a plurality of sensing signal lines formed lo to be parallel to the data lines on the first substrate; a plurality of first touch driving voltage lines formed to be parallel to the gate lines; a driving thin film transistor (TFT) formed at each pixel so as to be connected to the gate lines and the data lines; a pixel electrode formed at each pixel so as to be connected to the driving TFT, a switching TFT formed at each pixel so as to be connected to the sensing signal lines and the gate lines; a photo TFT formed in each pixel so as to be connected to the first touch driving voltage lines and the switching TFT and serving to recognize an applied touch; a second substrate attached to the first substrate in a facing manner; a common electrode formed on the second substrate; an electrophoretic film formed between the first and second substrates; a lead-out driver for detecting a position of the photo TFT when a sensing signal is transferred via the switching TFT in a corresponding pixel and the sensing signal lines according to an operation of the photo TFT, and outputting touch data; a gate control signal generating unit for outputting a second gate control signal indicating a touch mode operation when touch data is not inputted from the lead-out driver, and outputting a first gate control signal indicating a driving mode operation for converting an image if it is determined that a touch has been applied upon receiving touch data from the lead-out driver; and a gate driver for driving the gate lines upon receiving the first or second gate control signal from the gate control signal generating unit, wherein a timing at which each gate line is turned on and off when the gate driver receives the first gate control signal and a timing at which each gate line is turned on and off when the second gate control signal is received are different.

The foregoing and other objects, features, aspects and advantages of the present invention will become more apparent from the following detailed description of the present invention when taken in conjunction with the accompanying drawings.

DETAILED DESCRIPTION OF THE INVENTION

A touch type electrophoretic display device according to an exemplary embodiment of the present invention will now be described in detail with reference to the accompanying drawings.

Figure 1:
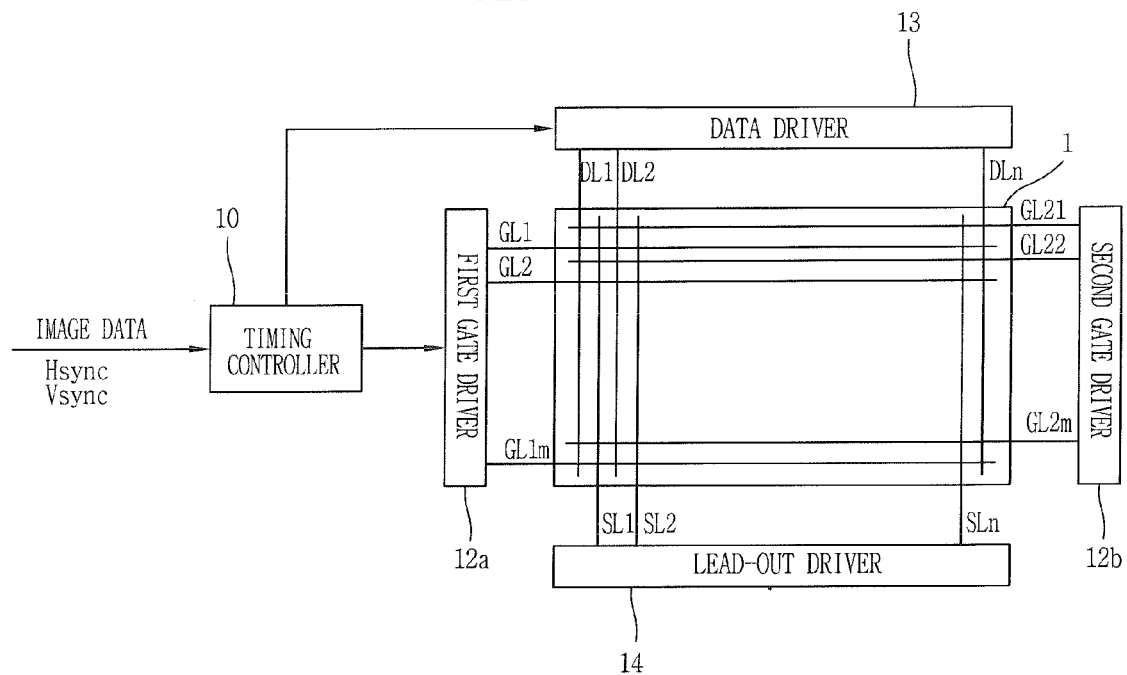
FIG. 1 is a block diagram showing a general touch type electrophoretic display device.
Figure 2:
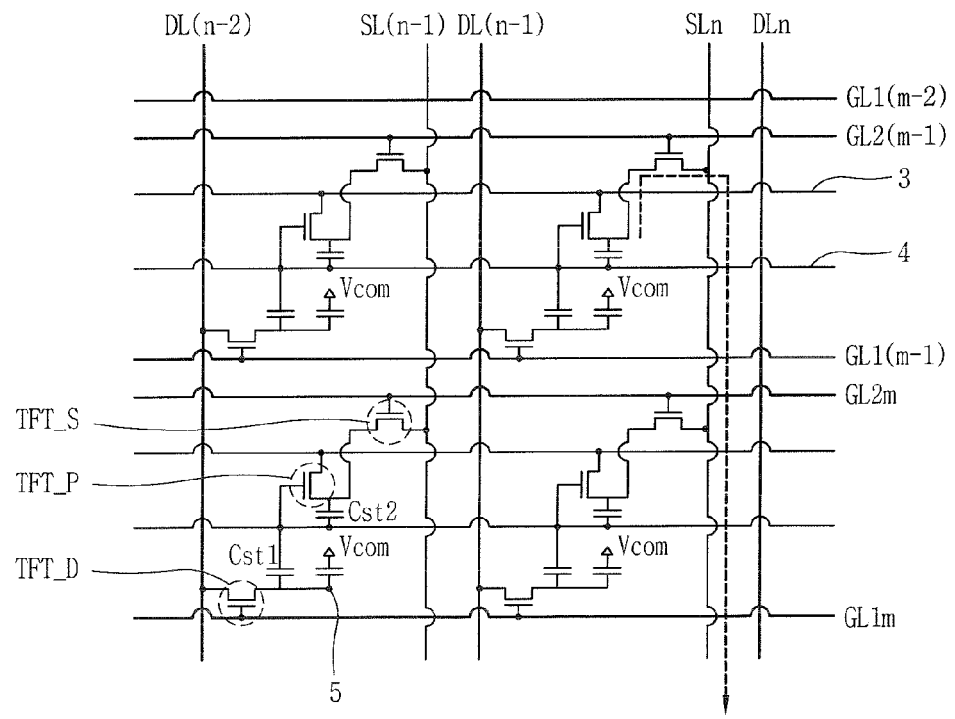
FIG. 2 is a circuit diagram showing a pixel structure defined on a first substrate of FIG. 1.
Figure 3:
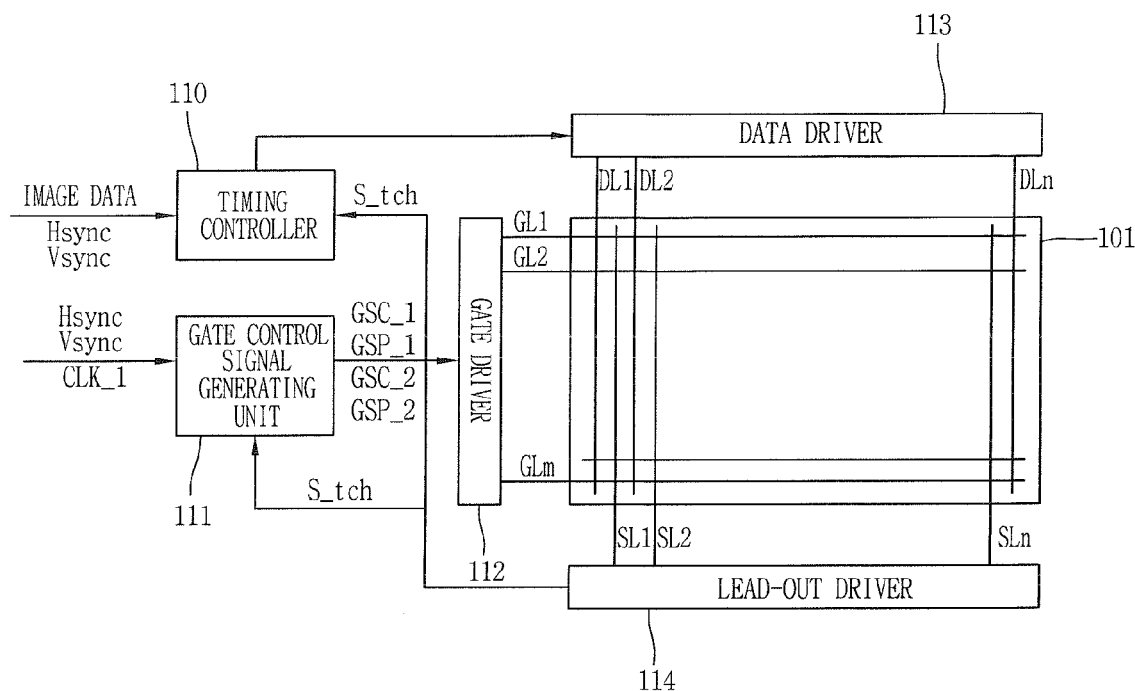
FIG. 3 is a block diagram showing a touch type electrophoretic display device according to an exemplary embodiment of the present invention.
Figure 4:
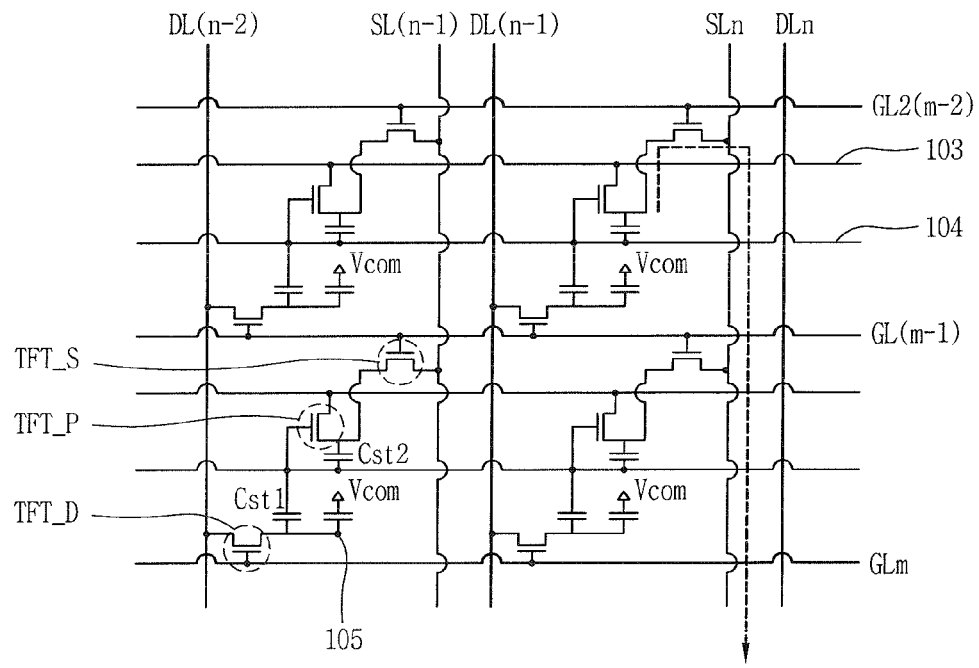
FIG. 4 is a circuit diagram showing a pixel structure defined on an electrophoretic panel of FIG. 3.
Figure 5:
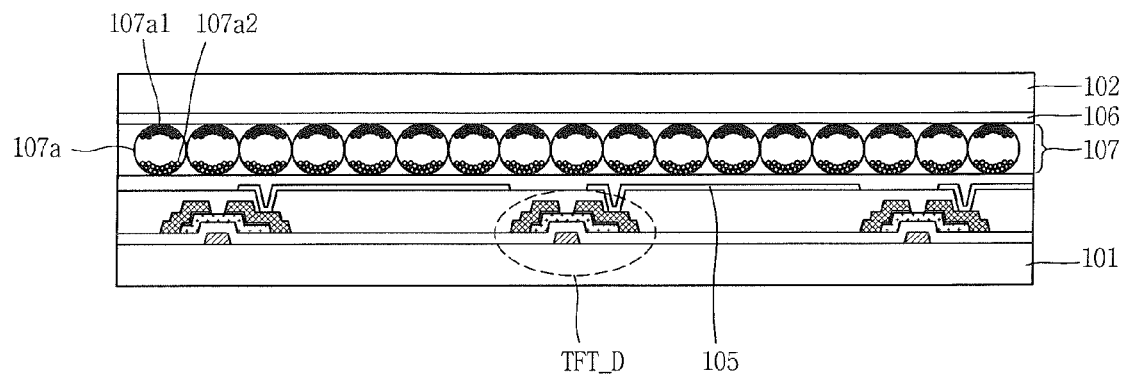
FIG. 5 is a sectional view of the electrophoretic panel of FIG. 3.

As shown in FIGS. 3 to 5, a touch type electrophoretic display device according to an embodiment of the present invention includes: a first substrate 101 on which a plurality of gate lines GL1~GLm and a plurality of data lines DL1~DLn cross to define a plurality of pixels; a plurality of sensing signal lines SL1~SLn formed to be parallel to the data lines DL1~DLn on the first substrate 101; a plurality of first touch driving voltage lines 103 formed to be parallel to the gate lines GL1~GLm; a driving thin film transistor (TFT_D) formed at each pixel so lo as to be connected to the gate lines GL1~GLm and the data lines DL1~DLn; a pixel electrode 105 formed at each pixel so as to be connected to the driving TFT (TFT_D); a switching TFT (TFT_S) formed at each pixel so as to be connected to the sensing signal lines SL1~SLn and the gate lines GL1~GLm; a photo TFT (TFT_P) formed in each pixel so as to be connected to the first touch driving voltage lines 103 and the switching TFT (TFT_S) and serving to recognize an applied touch; a second substrate 102 attached to the first substrate 101 in a facing manner; a common electrode 106 formed on the second substrate 102; an electrophoretic film 107 formed between the first and second substrates 101 AND 102; a lead-out driver 114 for detecting a position of the photo TFT (TFT_P) when a sensing signal is transferred via the switching TFT (TFT_S) in a corresponding pixel and the sensing signal lines (SL1~SLn) according to an operation of the photo TFT (TFT_P), and outputting touch data; a gate control signal generating unit 111 for outputting second gate control signals (GSC_2, GSP_2) indicating a touch mode operation when touch data (S_tch) is not inputted from the lead-out driver 114, and outputting first gate control signals (GSC_1, GSP_1) indicating a driving mode operation for converting an image if it is determined that a touch has been applied upon receiving touch data (S_tch) from the lead-out driver 114; and a gate driver (GSC_2, GSP_2112) for driving the gate lines (GL1~GLm) upon receiving the first gate control signals (GSC_1, GSP_1) or the second gate control signals (GSC_2, GSP_2) from the gate control signal generating unit 111.

A timing at which each gate line is turned on and off when the gate driver 112 receives the first gate control signals (GSC_1, GSP_1) and a timing at which each gate line is turned on and off when the second gate control signals (GSC_2, GSP_2) is received are different.

The touch type electrophoretic display device according to an embodiment lo of the present invention includes the electrophoretic panel comprised of the first substrate 101, an upper substrate, and the second substrate 102, a lower substrate. The electrophoretic film 107 is formed between the first and second substrates 101 and 102.

With reference to FIG. 5, the electrophoretic film 107 includes a plurality of electronic ink capsules 107a formed in a polymer binder. Electronic ink distributed in the capsules 107a includes white ink 107a2 and black ink 107a1, and the white ink 107a2 and the black ink 107a1 are charged with each different polarity. Namely, the white ink 107a2 is charged with positive (+) electric charges, and the black ink 107a1 is charged with negative (−) electric charges, or vice versa. In the following description, the case where the white ink 107a2 is charged with positive (+) electric charges, and the black ink 107a1 is charged with negative (−) electric charges will be taken as an example.

With reference to FIGS. 3 and 4, a plurality (e.g., m number) of gate lines GL1~GLm and a plurality (e.g., n number) of data lines (DL1~DLn) are formed to cross to define a plurality of pixels on the first substrate 101. The plurality of pixels form a plurality of horizontal pixel rows. The gate lines GL1~GLm are formed one by one between the plurality of horizontal pixel rows, and one gate line is additionally formed above the first horizontal pixel row.

A plurality (e.g., n number) of sensing signal lines SL1~SLn are formed to be parallel to the data lines DL1~DLn, and a plurality (e.g., m-1 number) of first touch driving voltage lines 103 and a plurality of second touch driving voltage lines 104 are formed to be parallel to the gate lines GL1~GLm.

With reference to FIG. 4, the driving TFT (TFT_D) and the pixel electrode 150 connected to the driving TFT (TFT_D) are formed at each crossing of the gate lines GL1~GLm and the data lines DL1~DLm of each pixel of the first substrate 101. In the driving TFT (TFT_D), a gate electrode is connected to the gate lines GL1~GLm, a source electrode is connected to the data lines DL1~DLn, and a drain electrode is connected to the pixel electrode 105.

The photo TFT (TFT_P) is formed at each pixel of the first substrate 101. The photo TFT (TFT_P) is connected to the first touch driving voltage lines 103 and the switching TFT (TFT_S). In the photo TFT (TFT_P), a gate electrode of is connected to the second touch driving voltage line 104, a source electrode is connected to the first touch driving voltage line 103, and a drain electrode is connected to a source electrode of the switching TFT (TFT_S). Whether the photo TFT (TFT_P) is turned on or off and a flow amount of the photo TFT (TFT_P) are determined according to the amount of light.

In the switching TFT (TFT_S), a gate electrode is connected to the gate lines GL1~GLm, a source electrode is connected to the drain electrode of the photo TFT (TFT_P) as mentioned above, and a drain electrode is connected to the sensing signal lines SL1~SLn. In more detail, the gate electrode of the switching TFT (TFT_S) is connected to the gate lines GL1~GL[m-1]) formed at an upper portion of the horizontal pixel row to which the gate electrode belongs.

With reference to FIG. 5, the pixel electrode 105 and the first touch driving voltage lines 103 form a first storage capacitor Cst1 with an insulating layer interposed therebetween, and the second touch driving voltage lines 104 and the drain electrode of the photo transistor (TFT_P) form a second storage capacitor Cst2 with an insulating layer interposed therebetween.

With reference to FIG. 5, the common electrode 106 is formed on the second substrate 102, and a common voltage Vcom is supplied to the common electrode 106. When a pixel voltage of negative (−) potential is applied to the pixel electrode 105 of the first substrate 101, the common electrode 106 has a relatively lo positive (+) potential, so the white ink 107a2 of the positive charge moves toward the pixel electrode 105 and the black ink 107a1 of negative charge moves toward the common electrode 106, implementing black. Meanwhile, when a voltage of positive potential is applied to the pixel electrode 105 of the first substrate 101, the common electrode 106 has a relatively negative potential, so the white ink 107a2 of positive charge moves toward the common electrode 106 and the black ink 107a1 of negative charge moves toward the pixel electrode 105, implementing white. The plurality of pixels are driven according to this principle, and as a result, an image is displayed on the electrophoretic panel.

With reference to FIG. 3, the touch type electrophoretic display device according to an embodiment of the present invention includes a driving unit for driving the electrophoretic panel. The driving unit includes a timing controller 110, a data driver 113, a lead-out driver 114, a gate control signal generating unit 111, a gate driver 112, and a power source unit (not shown).

The timing controller 110 receives a horizontal synchronization signal Hsync, a vertical synchronization signal Vsync, and the like, from an external source (e.g., system) to generate data control signals such as a source start pulse SSP, a source shift clock SSC, a source output enable (SOE), a data reverse REV, a polarity control (POL), and the like, and outputs a pixel voltage which has realigned image data received from the external source. When the timing controller 110 receives the touch data (S_tch) from the lead-out driver 114, it outputs a pixel voltage for converting an image in relation to a portion touched by the user.

With reference to FIG. 3, the data driver 113 receives the data control signal and the pixel voltage from the timing controller 110 and supplies the pixel voltage to the data lines DL1~DLn according to the data control signal.

When the user touches the electrophoretic panel, the amount of light at the touched portion changes. Then, the photo TFT (TFT_P) operates to transfer a sensing signal through the switching TFT (TFT_S) and the sensing signal lines (SL1~SLn) in the corresponding pixel. At this time, the lead-out driver 114 detects the position of the photo TFT (TFT_P) in operation and outputs the touch data (S_tch). The touch data (S_tch) may include coordinates of the touched portion.

The gate control signal generating unit 111 receives the touch data (S_tch) from the lead-out driver 114, and if it is determined that a touch has been applied, the gate control signal generating unit 111 outputs the first gate control signals (GSC_1, GSP_1) indicating the driving mode operation for converting an image, and otherwise, the gate control signal generating unit 111 outputs the second gate control signals (GSC_2, GSP_2) indicating the touch mode operation. The gate control signal generating unit 111 may be disposed within or outside the timing controller 110. In the present invention, it is assumed that the gate control signal generating unit 111 is disposed outside the timing controller 110, and a detailed configuration of the gate control signal generating unit 111 will be described later with reference to FIG. 6.

With reference to FIG. 3, if the gate driver 112 receives the first gate control signals (GSC_1, GSP_1) from the gate control signal generating unit 111, it drives the gate lines GL1~GLm in the driving mode for image conversion. If the gate driver 112 receives the second gate control signals (GSC_2, GSP_2) from the gate control signal generating unit 111, it drives the gate lines GL1~GLm in the touch mode for recognizing a user's touch. A timing at which the gate driver 112 turns on and off each gate line GL1~GLn upon receiving the first gate control signals (GSC_1, GSP_1) and a timing at which the gate driver turns on and off each gate line GL1~GLn upon receiving the second gate control signals (GSC_2, GSP_2) are different.

Although not shown, the power source unit (not shown) generates various voltages for driving the gate driver 112, the data driver 113, and the lead-out driver 114. In particular, the power source unit supplies a first touch driving voltage of a certain potential (e.g., 12V) to the first touch driving voltage lines 103 and a second touch driving voltage of a certain potential (e.g., 0V) to the second touch driving voltage lines 103.

In the touch type electrophoretic display device constructed as described above according to an embodiment of the present invention is driven discriminately in the touch mode and the driving mode as mentioned above. The touch mode is a mode for recognizing a user's touch, and the driving mode is a mode for performing an operation of changing an image displayed on the electrophoretic panel when the user touches the electrophoretic panel.

Namely, in the touch mode, the gate control signal generating unit 111 supplies the second gate control signals (GSC_2, GSP_2) to the gate driver 112 to make the gate lines GL1~GLm sequentially turned on or off one by one at a timing suitable for the touch mode. In the driving mode, the gate control signal generating unit 111 supplies the first gate control signals (GSC_1, GSP_1) to the gate driver 112 to make the gate lines GL1~GLm sequentially turned on and off one by one at a timing suitable for the driving mode. Detailed description related to such driving operation will be described when the gate control signal generating unit 111 is described hereinafter The gate control signal generating unit 111 will now be described in detail with reference to FIGS. 3 to 5.

Figure 6:
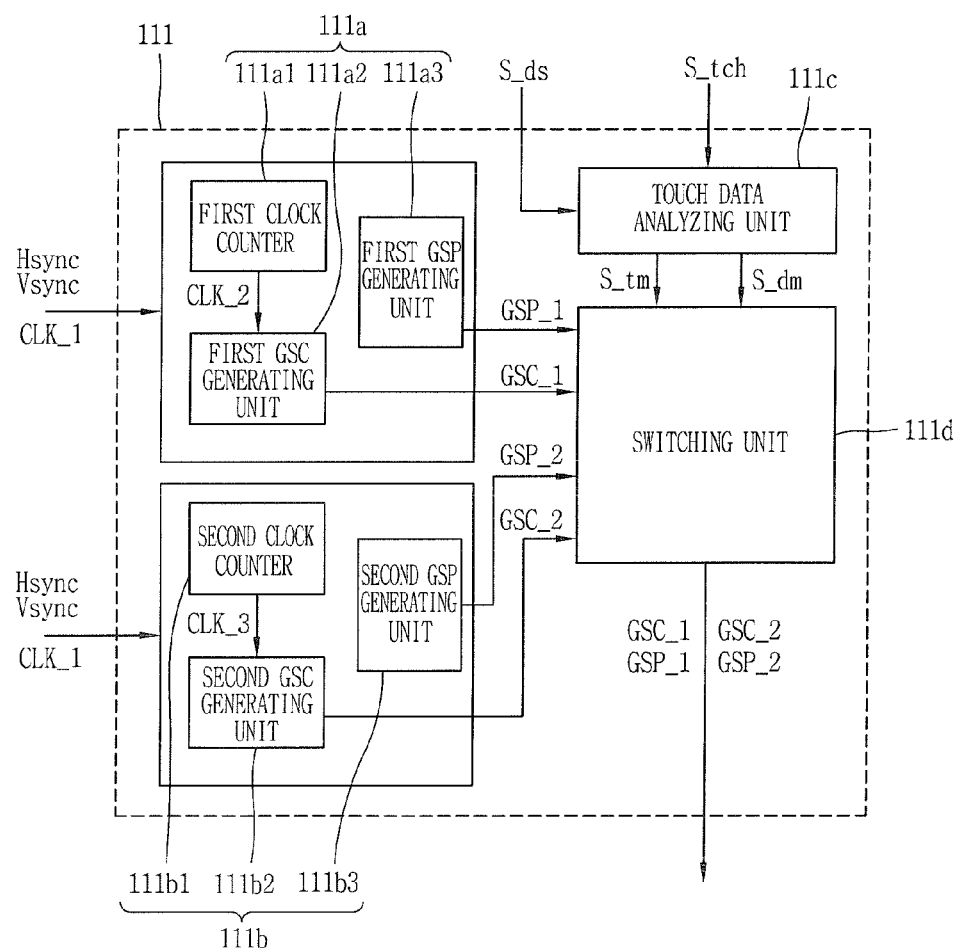
FIG. 6 is a block diagram showing a detailed configuration of a gate control signal generating unit of FIG. 3.

With reference to FIG. 6, the gate control signal generating unit 111 includes a first control signal generating unit 111a1 for generating a first gate shift clock (GSC_1) and a first gate start pulse (GSP_1) by using signals inputted from an external source; a second control signal generating unit 111b for generating a second gate shift clock (GSC_2) and a second gate start pulse (GSP_2) by using signals inputted from an external source; a touch data analyzing unit 111c for generating a touch mode switching signal (S_tm) if no touch data (S_tch) is inputted from the lead-out driver 114, and generating a driving mode switching signal (S_dm) if it is determined that a touch has been applied after touch data (S_tch) is received from the lead-out driver 114 and analyzed; and a switching unit 111d for switching to output the first shift clock (GSC_1) and the first gate start pulse (GSP_1) of the first gate control signal generating unit 111a to the gate driver 112 if the driving mode switching signal (S_dm) is received from the touch data analyzing unit 111c, and switching to output the second gate shift clock (GSC_2) and the second gate start pulse (GSP_2) of the second gate control signal to the gate driver 112 if the touch mode switching signal (S_tm) is received from the touch data analyzing unit 111c.

With reference to FIG. 6, the first gate control signal generating unit 111a includes a first clock counter 111a1 for counting a first clock signal (CLK_1) continuously inputted from the exterior by a certain number of times and outputting a second clock signal (CLK_2); a first gate shift clock (GSC) generating unit 111a2 for generating a first gate shift clock (GSC_1) by using the horizontal synchronization signal Hsync inputted from the exterior and the second clock signal (CLK_2) inputted from the first clock counter 111a1; and a first gate start pulse (GSP) generating unit 111a3 for generating a first gate start pulse (GSP_1) by using the vertical synchronization signal Vsync inputted from the exterior.

Preferably, a clock width of the first gate shift clock (GSC_1) is designed to allow the gate driver 112, which drives the gate lines GL1~GLm upon receiving the first gate shift clock (GSC_1), to drive the gate lines GL1~GLm at a timing suitable for the driving mode for changing images of the electrophoretic panel. This is because, in the driving mode, the timing at which the gate driver 112 turns on the gate lines GL1~GLm is determined by the clock width of the first gate shift clock (GSC_1).

Preferably, the number of the first clock signals (CLK_1) counted by the first clock counter 111a1 to generate the second clock signal (CLK_2) is designed such that the first gate shift clock generating unit 111a2 can generate the first gate shift clock (GSC_1) of a clock width suitable for the driving mode.

The second gate control signal generating unit 111b includes a second clock counter 111b1 for counting the first clock signal (CLK_1) continuously inputted from the exterior by a certain number of times and outputting a third clock signal (CLK_3); a second gate shift clock generating unit 111b2 for generating a second gate shift clock (GSC_2) by using the horizontal synchronization signal Hsync inputted from the exterior and the third clock signal (CLK_3) inputted from the second clock counter 111b1; and a second gate start pulse generating unit 111b3 for generating a second gate start pulse (GSP_2) by using the vertical synchronization signal Vsync inputted from the exterior.

Preferably, a clock width of the secibd gate shift clock (GSC_2) is designed to allow the gate driver 112, which drives the gate lines GL1~GLm upon receiving the second gate shift clock (GSC_2), to drive the gate lines GL1~GLm at a timing suitable for the touch mode for recognizing a user's touch. This is because, in the touch mode, the timing at which the gate driver 112 turns on the gate lines GL1~GLm is determined by the clock width of the second gate shift clock (GSC_2).

The number of the first clock signals (CLK_1) counted by the second clock lo counter 111b1 to generate the third clock signal (CLK_3) is different from the number of first clock signals CLK_1 by the first clock counter 111a1 to generate the second clock signal CLK_2. Namely, preferably, the number of the first clock signals (CLK_1) counted by the second clock counter 111b1 to generate the third clock signal (CLK_3) is designed such that the second gate shift clock generating unit 111b2 can generate the second gate shift clock (GSC_2) of a clock width suitable for the touch mode by using the second clock signal (CLK_2).

With reference to FIG. 6, the touch data analyzing unit 111c analyzes the touch data (S_tch) supplied from the lead-out driver 114, and if it is determined that a touch has been applied, the touch data analyzing unit 111c generates the driving mode switching signal (S_dm), or otherwise, it generates the touch mode switching signal (S_tm).

A driving start signal (S_ds) for displaying an initial image is inputted to the touch data analyzing unit 111c at an early driving of the electrophoretic panel. As shown in FIG. 6, the driving start signal (S_ds) may be inputted from an external source (e.g., system) or may be generated from within the gate control signal generating unit 111.

With reference to FIG. 6, when the switching unit 111d receives the driving mode switching signal (S_dm) from the touch data analyzing unit 111c, it switches to output the first gate shift clock (GSC_1) and the first gate start pulse (GSP_1) generated by the first gate control signal generating unit 111a to the gate driver 112. When the switching unit 111d receives the touch mode switching signal (S_tm) from the touch data analyzing unit 111c, it switches to output the secibd gate shift clock (GSC_2) and the second gate start pulse (GSP_2) generated by the second gate control signal generating unit 111b to the gate driver 112.

With such configuration, when the gate control signal generating unit 111 determines that a touch has been applied upon receiving the touch data (S_tch) from the lead-out driver 114, it supplies the first gate shift clock (GSC_1) and the first gate start pulse (GSP_1) to the gate driver 112 so that the gate driver 112 can drive the gate lines GL1~GLm at a timing suitable for the driving mode. Otherwise, the gate control signal generating unit 111 supplies the second gate shift clock (GSC_2) and the second gate start pulse (GSP_2) to the gate driver 112 so that the gate driver 112 can drive the gate lines GL1~GLm at a timing suitable for the touch mode. Accordingly, the touch type electrophoretic display device according to the embodiments of the present invention has the advantage that, compared with the related art, the number of gate lines GL1~GLm can be significantly reduced, and in addition, the number or size of the gate driver 112 can be minimized.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A touch type electrophoretic display device comprising:
    a first substrate on which a plurality of gate lines and a plurality of data lines cross to define a plurality of pixels;
    a plurality of sensing signal lines formed to be parallel to the data lines on the first substrate;
    a plurality of first touch driving voltage lines formed to be parallel to the gate lines;
    a driving thin film transistor (TFT) formed at each pixel so as to be connected to the gate lines and the data lines;
    a pixel electrode formed at each pixel so as to be connected to the driving TFT;
    a switching TFT formed at each pixel so as to be connected to the sensing signal lines and the gate lines;
    a photo TFT formed in each pixel so as to be connected to the first touch driving voltage lines and the switching TFT and serving to recognize an applied touch;
    a second substrate attached to the first substrate in a facing manner;
    a common electrode formed on the second substrate;
    an electrophoretic film formed between the first and second substrates;

a lead-out driver for detecting a position of the photo TFT when a sensing signal is transferred via the switching TFT in a corresponding pixel and the sensing signal lines according to an operation of the photo TFT, and outputting touch data;

a gate control signal generating unit for outputting a second gate control signal indicating a touch mode operation when touch data is not inputted from the lead-out driver, and outputting a first gate control signal indicating a driving mode operation for converting an image if it is determined that a touch has been applied upon receiving touch data from the lead-out driver; and a gate driver for driving the gate lines upon receiving the first or second gate control signal from the gate control signal generating unit, wherein a timing at which each gate line is turned on and off when the gate driver receives the first gate control signal and a timing at which each gate line is turned on and off when the second gate control signal is received are different, wherein a touch data analyzing unit for generating a touch mode switching signal if no touch data is inputted from the lead-out driver, and generating a driving mode switching signal if it is determined that a touch has been applied after touch data is received from the lead-out driver and analyzed, and wherein a driving start signal for a driving mode operation is inputted to the touch data analyzing unit of the gate control signal generating unit at an early driving, and when the driving start signal is inputted to the touch data analyzing unit, the touch data analyzing unit outputs a driving mode switching signal to the switching unit.

2. The device of claim 1, wherein n number of second touch driving voltage lines are additionally formed to be parallel to the first touch driving voltage lines on the first substrate, a gate electrode of the driving TFT is connected to the gate line, a source electrode of the driving TFT is connected to the data line, and a drain electrode of the driving TFT is connected to the pixel electrode, and the pixel electrode and the second touch driving voltage line form a first storage capacitor with an insulating layer interposed therebetween.

3. The device of claim 1, wherein n number of second touch driving voltage lines are additionally formed to be parallel to the first touch driving voltage lines on the first substrate, a gate electrode of the photo TFT is connected to the second touch driving voltage line, a source electrode of the photo TFT is connected to the first touch driving voltage line, a drain electrode of the photo TFT is connected to a source electrode of the switching TFT, and the second touch driving voltage line and the drain electrode of the photo TFT form a second storage capacitor with an insulating layer interposed therebetween.

4. The device of claim 1, wherein a gate electrode of the switching TFT is connected to the gate line, the source electrode of the switching TFT is connected to the drain electrode of the photo TFT, and a drain electrode of the switching TFT is connected to the sensing signal line.

5. The device of claim 1, wherein the plurality of pixels defined on the first substrate form a plurality of horizontal pixel rows, the gate lines are formed one by one between the plurality of horizontal pixel rows and a gate line is additionally formed at an upper portion of a first horizontal pixel row, the gate electrode of the switching TFT is connected to the gate line formed at the upper portion of the horizontal pixel row to which the gate electrode belongs, the source electrode of the switching TFT is connected to the drain electrode of the photo TFT, and the drain electrode of the switching TFT is connected to the sensing signal line.

6. The device of claim 1, wherein the gate control signal generating unit comprises:

a first control signal generating unit for generating a first gate shift clock and a first gate start pulse by using signals inputted from an external source;

a second control signal generating unit for generating a second gate shift clock and a second gate start pulse by using signals inputted from an external source;

a switching unit for switching to output the first shift clock and the first gate start pulse of the first gate control signal generating unit to the gate driver if the driving mode switching signal is received from the touch data analyzing unit, and switching to output the second gate shift clock and the second gate start pulse of the second gate control signal to the gate driver if the touch mode switching signal is received from the touch data analyzing unit.

7. The device of claim 6, wherein the first gate control signal generating unit comprises:

a first clock counter for counting a first clock signal continuously inputted from the exterior by a certain number of times and outputting a second clock signal;

a first gate shift clock generating unit for generating a first gate shift clock by using the horizontal synchronization signal inputted from the exterior and the second clock signal inputted from the first clock counter; and a first gate start pulse generating unit for generating a first gate start pulse by using the vertical synchronization signal inputted from the exterior, and the second gate control signal generating unit comprises:

a second clock counter for counting the first clock signal continuously inputted from the exterior by a certain number of times and outputting a third clock signal;

a second gate shift clock generating unit for generating a second gate shift clock by using the horizontal synchronization signal inputted from the exterior and the third clock signal inputted from the second clock counter; and a second gate start pulse generating unit for generating a second gate start pulse by using the vertical synchronization signal inputted from the exterior, wherein the number of the first clock signals counted by the first clock counter to generate the second clock and the number of first clock signals counted by the second clock counter to generate the third clock signal are different.

* * * * *